US010856302B2

(12) United States Patent
Whinnett et al.

(10) Patent No.: US 10,856,302 B2
(45) Date of Patent: Dec. 1, 2020

(54) MULTIMODE BASE STATION

(71) Applicant: Intel Corporation, Santa Clara, CA (US)

(72) Inventors: Nicholas William Whinnett, Wiltshire (GB); Fiona Clare Angharad Somerville, Bristol (GB)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 15/452,517

(22) Filed: Mar. 7, 2017

(65) Prior Publication Data

US 2017/0181179 A1 Jun. 22, 2017

Related U.S. Application Data

(63) Continuation of application No. 13/440,880, filed on Apr. 5, 2012.

(30) Foreign Application Priority Data

Apr. 5, 2011 (GB) .................................. 1105769.2

(51) Int. Cl.
*H04W 48/20* (2009.01)
*H04W 72/08* (2009.01)
(Continued)

(52) U.S. Cl.
CPC ......... *H04W 72/085* (2013.01); *H04W 48/20* (2013.01); *H04W 72/0486* (2013.01);
(Continued)

(58) Field of Classification Search
CPC ....... H04W 64/00; H04W 4/02; H04W 36/08; H04W 36/14; H04W 36/06; H04W 48/20;
(Continued)

(56) References Cited

U.S. PATENT DOCUMENTS 4,380,046 A 4/1983 Frosch et al.
4,574,345 A 3/1986 Konesky
(Continued)

FOREIGN PATENT DOCUMENTS

CN 101754351 A 6/2010
CN 101873688 A 10/2010
(Continued)

OTHER PUBLICATIONS

"Details on specification aspects for UL ICIC", Qualcomm Europe, May 5-May 9, 2008, 2 pages.
(Continued)

*Primary Examiner* — Lester G Kincaid
*Assistant Examiner* — Dung L Lam
(74) *Attorney, Agent, or Firm* — Schiff Hardin LLP

(57) ABSTRACT

A method of controlling admission of a user equipment to a cell of a multi-mode base station, being a base station arranged to operate as a plurality of cells, the plurality of cells comprising at least a first cell and a second cell, and the method comprising: determining information relating to the first cell, and controlling admission of a user equipment to the second cell in dependence on the information relating to the first cell.

21 Claims, 2 Drawing Sheets

(51) Int. Cl.
*H04W 72/04* (2009.01)
*H04W 36/24* (2009.01)
*H04W 88/06* (2009.01)
*H04W 84/04* (2009.01)

(52) U.S. Cl.
CPC ........ *H04W 36/245* (2013.01); *H04W 84/045* (2013.01); *H04W 88/06* (2013.01)

(58) Field of Classification Search
CPC ........... H04W 36/245; H04W 72/0486; H04W 72/085; H04W 84/045; H04W 88/06; H04L 12/5695; G06Q 30/0254
See application file for complete search history.

(56) References Cited

U.S. PATENT DOCUMENTS

| | | |
|---|---|---|
| 4,589,066 A | 5/1986 | Lam et al. |
| 4,601,031 A | 7/1986 | Walker et al. |
| 4,603,404 A | 7/1986 | Yamauchi et al. |
| 4,622,632 A | 11/1986 | Tanimoto et al. |
| 4,698,746 A | 10/1987 | Goldstein |
| 4,720,780 A | 1/1988 | Dolecek |
| 4,736,291 A | 4/1988 | Jennings et al. |
| 4,814,970 A | 3/1989 | Barbagelata et al. |
| 4,825,359 A | 4/1989 | Ohkami et al. |
| 4,858,233 A | 8/1989 | Dyson et al. |
| 4,890,279 A | 12/1989 | Lubarsky |
| 4,914,653 A | 4/1990 | Bishop et al. |
| 4,937,741 A | 6/1990 | Harper et al. |
| 4,943,912 A | 7/1990 | Aoyama et al. |
| 4,967,326 A | 10/1990 | May |
| 4,974,146 A | 11/1990 | Works et al. |
| 4,974,190 A | 11/1990 | Curtis |
| 4,992,933 A | 2/1991 | Taylor |
| 5,036,453 A | 7/1991 | Renner et al. |
| 5,038,386 A | 8/1991 | Li |
| 5,065,308 A | 11/1991 | Evans |
| 5,109,329 A | 4/1992 | Strelioff |
| 5,152,000 A | 9/1992 | Hillis |
| 5,193,175 A | 3/1993 | Cutts, Jr. et al. |
| 5,233,615 A | 8/1993 | Goetz |
| 5,239,641 A | 8/1993 | Horst |
| 5,241,491 A | 8/1993 | Carlstedt |
| 5,247,694 A | 9/1993 | Dahl |
| 5,253,308 A | 10/1993 | Johnson |
| 5,265,207 A | 11/1993 | Zak et al. |
| 5,280,584 A | 1/1994 | Caesar et al. |
| 5,384,697 A | 1/1995 | Pascucci |
| 5,386,495 A | 1/1995 | Wong et al. |
| 5,408,676 A | 4/1995 | Mori |
| 5,410,723 A | 4/1995 | Schmidt et al. |
| 5,410,727 A | 4/1995 | Jaffe et al. |
| 5,473,731 A | 12/1995 | Seligson |
| 5,555,548 A | 9/1996 | Iwai et al. |
| 5,557,751 A | 9/1996 | Banman et al. |
| 5,570,045 A | 10/1996 | Erdal et al. |
| 5,600,784 A | 2/1997 | Bissett et al. |
| 5,692,139 A | 11/1997 | Slavenburg et al. |
| 5,719,445 A | 2/1998 | McClure |
| 5,734,921 A | 3/1998 | Dapp et al. |
| 5,752,067 A | 5/1998 | Wilkinson et al. |
| 5,761,514 A | 6/1998 | Aizikowitz et al. |
| 5,790,879 A | 8/1998 | Wu |
| 5,795,797 A | 8/1998 | Chester et al. |
| 5,796,937 A | 8/1998 | Kizuka |
| 5,802,561 A | 9/1998 | Fava et al. |
| 5,805,839 A | 9/1998 | Singhal |
| 5,826,033 A | 10/1998 | Hayashi et al. |
| 5,826,049 A | 10/1998 | Ogata et al. |
| 5,826,054 A | 10/1998 | Jacobs et al. |
| 5,845,060 A | 12/1998 | Vrba et al. |
| 5,860,008 A | 1/1999 | Bradley |
| 5,861,761 A | 1/1999 | Kean |
| 5,864,706 A | 1/1999 | Kurokawa et al. |
| 5,923,615 A | 7/1999 | Leach et al. |
| 5,926,640 A | 7/1999 | Mason et al. |
| 5,946,484 A | 8/1999 | Brandes |
| 5,951,664 A | 9/1999 | Lambrecht et al. |
| 5,959,995 A | 9/1999 | Wicki et al. |
| 5,963,609 A | 10/1999 | Huang |
| 6,023,757 A | 2/2000 | Nishimoto et al. |
| 6,044,451 A | 3/2000 | Slavenburg et al. |
| 6,052,752 A | 4/2000 | Kwon |
| 6,055,285 A | 4/2000 | Alston |
| 6,069,490 A | 5/2000 | Ochotta et al. |
| 6,101,599 A | 8/2000 | Wright et al. |
| 6,122,677 A | 9/2000 | Porterfield |
| 6,167,502 A | 12/2000 | Pechanek et al. |
| 6,173,386 B1 | 1/2001 | Key et al. |
| 6,175,665 B1 | 1/2001 | Sawada |
| 6,199,093 B1 | 3/2001 | Yokoya |
| 6,317,820 B1 | 11/2001 | Shiell et al. |
| 6,345,046 B1 | 2/2002 | Tanaka |
| 6,360,259 B1 | 3/2002 | Bradley |
| 6,381,293 B1 | 4/2002 | Lee et al. |
| 6,381,461 B1 | 4/2002 | Besson et al. |
| 6,393,026 B1 | 5/2002 | Irwin |
| 6,408,402 B1 | 6/2002 | Norman |
| 6,424,870 B1 | 7/2002 | Maeda et al. |
| 6,448,910 B1 | 9/2002 | Lu |
| 6,499,096 B1 | 12/2002 | Suzuki |
| 6,499,097 B2 | 12/2002 | Tremblay et al. |
| 6,567,417 B2 | 5/2003 | Kalkunte et al. |
| 6,615,339 B1 | 9/2003 | Ito et al. |
| 6,631,439 B2 | 10/2003 | Saulsbury et al. |
| 6,681,341 B1 | 1/2004 | Fredenburg et al. |
| 6,775,766 B2 | 8/2004 | Revilla et al. |
| 6,795,422 B2 | 9/2004 | Ohsuge |
| 6,829,296 B1 | 12/2004 | Troulis et al. |
| 6,892,293 B2 | 5/2005 | Sachs et al. |
| 6,928,500 B1 | 8/2005 | Ramanujan et al. |
| 6,952,181 B2 | 10/2005 | Karr et al. |
| 6,961,782 B1 | 11/2005 | Denneau et al. |
| 6,996,157 B2 | 2/2006 | Ohsuge |
| 7,103,008 B2 | 9/2006 | Greenblat et al. |
| 7,161,978 B2 | 1/2007 | Lu et al. |
| 7,237,055 B1 | 6/2007 | Rupp |
| 7,302,552 B2 | 11/2007 | Guffens et al. |
| 7,340,017 B1 | 3/2008 | Banerjee |
| 7,342,414 B2 | 3/2008 | DeHon et al. |
| 7,383,422 B2 | 6/2008 | Kageyama et al. |
| 7,428,721 B2 | 9/2008 | Rohe et al. |
| 7,477,659 B1 | 1/2009 | Nee et al. |
| 7,549,081 B2 | 6/2009 | Robbins et al. |
| 7,672,836 B2 | 3/2010 | Lee et al. |
| 7,712,067 B1 | 5/2010 | Fung et al. |
| 7,801,029 B2 | 9/2010 | Wrenn et al. |
| 7,804,719 B1 | 9/2010 | Chirania et al. |
| 8,032,142 B2 | 10/2011 | Carter et al. |
| 8,195,239 B2 | 6/2012 | Lan et al. |
| 2002/0045433 A1 | 4/2002 | Vihriala |
| 2002/0069345 A1 | 6/2002 | Mohamed et al. |
| 2002/0174318 A1 | 11/2002 | Stuttard et al. |
| 2002/0198606 A1 | 12/2002 | Satou |
| 2003/0154358 A1 | 8/2003 | Seong et al. |
| 2003/0235241 A1 | 12/2003 | Tamura |
| 2004/0078548 A1 | 4/2004 | Claydon et al. |
| 2004/0083409 A1 | 4/2004 | Rozenblit et al. |
| 2004/0139466 A1 | 7/2004 | Sharma et al. |
| 2004/0150422 A1 | 8/2004 | Wong |
| 2004/0198386 A1 | 10/2004 | Dupray |
| 2005/0083840 A1 | 4/2005 | Wilson |
| 2005/0114565 A1 | 5/2005 | Gonzalez et al. |
| 2005/0124344 A1 | 6/2005 | Laroia et al. |
| 2005/0163248 A1 | 7/2005 | Berangi et al. |
| 2005/0250502 A1 | 11/2005 | Laroia et al. |
| 2005/0282500 A1 | 12/2005 | Wang et al. |
| 2006/0087323 A1 | 4/2006 | Furse et al. |
| 2006/0089154 A1 | 4/2006 | Laroia et al. |
| 2006/0120282 A1 | 6/2006 | Carlson et al. |
| 2006/0251046 A1 | 11/2006 | Fujiwara |
| 2006/0268962 A1 | 11/2006 | Cairns et al. |
| 2007/0036251 A1 | 2/2007 | Jelonnek et al. |

(56) References Cited

U.S. PATENT DOCUMENTS

| | | | |
|---|---|---|---|
| 2007/0127556 A1 | 6/2007 | Sato | |
| 2007/0173255 A1 | 7/2007 | Tebbit et al. | |
| 2007/0183427 A1 | 8/2007 | Nylander et al. | |
| 2007/0220522 A1 | 9/2007 | Coene et al. | |
| 2007/0220586 A1 | 9/2007 | Salazar et al. | |
| 2007/0248191 A1 | 10/2007 | Pettersson | |
| 2007/0254620 A1 | 11/2007 | Lindqvist et al. | |
| 2007/0263544 A1 | 11/2007 | Yamanaka et al. | |
| 2007/0270151 A1 | 11/2007 | Claussen et al. | |
| 2008/0102839 A1* | 5/2008 | Kurokawa | H04W 36/0083 455/439 |
| 2008/0146154 A1 | 6/2008 | Claussen et al. | |
| 2008/0151832 A1 | 6/2008 | Iwasaki | |
| 2009/0003263 A1 | 1/2009 | Foster et al. | |
| 2009/0028113 A1 | 1/2009 | Moon et al. | |
| 2009/0046665 A1 | 2/2009 | Robson et al. | |
| 2009/1004259 | 2/2009 | Yavuz et al. | |
| 2009/0080550 A1 | 3/2009 | Kushioka | |
| 2009/0092122 A1 | 4/2009 | Czaja et al. | |
| 2009/0097452 A1 | 4/2009 | Gogic | |
| 2009/0098871 A1 | 4/2009 | Gogic | |
| 2009/0111503 A1 | 4/2009 | Pedersen et al. | |
| 2009/0150420 A1 | 6/2009 | Towner | |
| 2009/0163216 A1 | 6/2009 | Hoang et al. | |
| 2009/0168907 A1 | 7/2009 | Mohanty et al. | |
| 2009/0196253 A1 | 8/2009 | Semper | |
| 2009/0215390 A1 | 8/2009 | Ku et al. | |
| 2009/0252200 A1 | 10/2009 | Dohler et al. | |
| 2009/0264077 A1 | 10/2009 | Damnjanovic | |
| 2009/0286544 A1* | 11/2009 | Huber | G06Q 20/1235 455/450 |
| 2009/0296635 A1 | 12/2009 | Hui et al. | |
| 2010/0035556 A1 | 2/2010 | Cai et al. | |
| 2010/0046455 A1 | 2/2010 | Wentink et al. | |
| 2010/0054237 A1 | 3/2010 | Han et al. | |
| 2010/0087148 A1 | 4/2010 | Srinivasan et al. | |
| 2010/0105345 A1 | 4/2010 | Thampi et al. | |
| 2010/0111070 A1 | 5/2010 | Hsu | |
| 2010/0142486 A1* | 6/2010 | Wahlqvist | H04W 72/0406 370/332 |
| 2010/0157906 A1 | 6/2010 | Yang et al. | |
| 2010/0195525 A1 | 8/2010 | Eerolainen | |
| 2010/0215032 A1 | 8/2010 | Jalloul et al. | |
| 2010/0216403 A1 | 8/2010 | Harrang | |
| 2010/0216485 A1 | 8/2010 | Hoole | |
| 2010/0222068 A1 | 9/2010 | Gaal et al. | |
| 2010/0234061 A1 | 9/2010 | Khandekar et al. | |
| 2010/0240385 A1 | 9/2010 | Lohr et al. | |
| 2010/0246506 A1 | 9/2010 | Krishnaswamy | |
| 2010/0248646 A1 | 9/2010 | Yamazaki et al. | |
| 2010/0273481 A1 | 10/2010 | Meshkati et al. | |
| 2010/0279689 A1 | 11/2010 | Tinnakornsrisuphap et al. | |
| 2010/0317352 A1 | 12/2010 | Nakata | |
| 2011/0002426 A1 | 1/2011 | Muirhead | |
| 2011/0122834 A1 | 5/2011 | Walker et al. | |
| 2011/0130143 A1 | 6/2011 | Mori et al. | |
| 2011/0170494 A1 | 7/2011 | Kim et al. | |
| 2012/0039284 A1* | 2/2012 | Barbieri | H04W 48/10 370/329 |
| 2013/0208689 A1* | 8/2013 | Kim | H04L 5/001 370/329 |

FOREIGN PATENT DOCUMENTS

| | | | |
|---|---|---|---|
| EP | 0180212 | A2 | 5/1986 |
| EP | 492174 | A2 | 7/1992 |
| EP | 0877533 | A2 | 11/1998 |
| EP | 0973099 | A2 | 1/2000 |
| EP | 0977355 | A2 | 2/2000 |
| EP | 1054523 | A1 | 11/2000 |
| EP | 1134908 | A2 | 9/2001 |
| EP | 1418776 | A1 | 5/2004 |
| EP | 1876854 | A1 | 1/2008 |
| EP | 1 946 506 | A1 | 7/2008 |
| EP | 2071738 | A1 | 6/2009 |
| EP | 2326118 | A1 | 5/2011 |
| GB | 2304495 | A | 3/1997 |
| GB | 2370380 | A | 6/2002 |
| GB | 2391083 | A | 1/2004 |
| GB | 2398651 | A | 8/2004 |
| GB | 2414896 | A | 12/2005 |
| GB | 2447439 | A | 9/2008 |
| GB | 2463074 | A | 3/2010 |
| JP | 61123968 | | 6/1986 |
| JP | A8297652 | | 11/1996 |
| JP | 11272645 | | 10/1999 |
| JP | 2001034471 | A | 2/2001 |
| JP | 2004525439 | A | 8/2004 |
| JP | 2006500673 | A | 1/2006 |
| WO | WO-90/04235 | A1 | 4/1990 |
| WO | WO-9111770 | A1 | 8/1991 |
| WO | WO-97026593 | A1 | 7/1997 |
| WO | WO-199850854 | A1 | 11/1998 |
| WO | WO-0102960 | A1 | 1/2001 |
| WO | WO-200250624 | A2 | 6/2002 |
| WO | WO-200250700 | A2 | 6/2002 |
| WO | WO-03001697 | A2 | 1/2003 |
| WO | WO-2004029796 | A2 | 4/2004 |
| WO | WO-2004034251 | A1 | 4/2004 |
| WO | WO-2004102989 | A1 | 11/2004 |
| WO | WO-2005048491 | A1 | 5/2005 |
| WO | WO-2006059172 | A1 | 6/2006 |
| WO | WO-2007021139 | A1 | 2/2007 |
| WO | WO-2007054127 | A1 | 5/2007 |
| WO | WO-2007056733 | A1 | 5/2007 |
| WO | WO-2007126351 | A1 | 11/2007 |
| WO | WO-2008030934 | A2 | 3/2008 |
| WO | WO-2008090154 | A1 | 7/2008 |
| WO | WO-2008099340 | A1 | 8/2008 |
| WO | WO-2008155732 | A2 | 12/2008 |
| WO | WO-2009054205 | A1 | 4/2009 |
| WO | WO-2010/072127 | A1 | 7/2010 |
| WO | WO-2010126155 | A1 | 11/2010 |

OTHER PUBLICATIONS

3GPP TS 36.331 v9.2.0 3RD Generation Partnership Project: Technical Specification Group Radio Access Network; Evolved Universal Terrestrial Radio Acces (E-UTRA); Radio Resource Control (RRC) Protocol specification (Release 9) Mar. 2010, pp. 1-248.

Alcatel-Lucent, et al., "Congested H(e)NB Hybrid Access Mode cell", 2009, 3GPP Draft; R3-091053-Congested H(e)NB, 3KU Generation Partnership Project (3GPP), Apr. 29, 2009, 4 pages.

Motorola, "Text proposal for TR 36.9xx: Reducing HeNB interference by dynamically changing HeNB access mode", 2009, 3GPP Draft: R4-094688, Apr. 29, 2009, 2 pages.

MIPS, MIPS32 Architecture for Programmers, 2001, MIPS Teclmologies, vol. 2, pp. 1-253.

Pechanek, et al. ManArray Processor Interconnection Network: An Introduction, Euro-Par'99, LNCS 1685, pp. 761-765, 1999.

Waddington, T., Decompilation of "hello world" on Pentium and SP ARC, 4 pages, [retrieved on Aug. 3, 2012]. Retrieved from the Internet:<URL: http://web.archive.org/web/200503IIII41936/http://boomerang.sourceforge.net/helloworld.html>.

Balakrishnan, et al., CodeSurfer/x86—A Platform for Analyzing x86 Executables, Springer-Verlag Berlin Heidelber, 2005, [retrieved on Dec. 30, 2011 ], retrieved from the internet:<URL:http://www.springerlink.com/content/uneu2a95u9nvb20v/>.

Miecznikowski, J., et al., "Decompiling Java Using Stage Encapsulation", Proceedings of the Eighth Working Conference on Reverse Engineering, Oct. 2-5, 2001.

Panesar, G. et al., "Deterministic Parallel Processing", Proceedings of the 1st Microgrid Workshop, Jul. 2005.

Towner, D. et al., "Debugging and Verification of Parallel Systems—the picoChip way", 2004.

picoChip, "PC7203 Development Platform Preliminary Product Brief", Jul. 2007.

Ennals, R. et al., "Task Partitioning for Multi-core Network Processors", 2005.

(56) References Cited

OTHER PUBLICATIONS

Rabideau, Daniel J., et al., "Simulated Annealing for Mapping DSP Algorithms on to Multiprocessors," Signals, Systems and Computers, 1993 Conference Record of the Twenty-Seventh Asilomar Conference, Nov. 1-3, 1993, IEEE, pp. 668-672.
Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.
Lin, Lian-Yu, et al., Communication-driven Task Binding for Multiprocessor with Latency Insensitive Network-on-Chip, Design Automation Conference, 2005 Proceedings of th ASP-DAC, Jan. 18/21, 2005, IEEE, pp. 39-44.
Holger Claussen, Bell Laboratories, Alcatel-Lucent; "Performance of Macro and Co-Channel Femtocells in a Hierarchical Cell Structure"; The 18th Annual IEEE Internation Symposium on Personal, Indoor and Mobile Radio Communications (PIMRC'07); 2007-09-0 I; pp. 1-5, XP03 I I 68593, ISBN: 978-1-4244-1143-6; Swindon, United Kingdom.
Shiroshita, T., et al.: "Reliable data distribution middleware for large-scale massive data replication" Parallel and Distributed Information Systems, 1993, Fourth International Conference on Miami Beach, FL, USA Dec. 18-20, 1996, Los Alamitos, CA, USA IEEE Comput. Soc, US, Dec. 18, 1996, pp. 196-205mXP010213188 ISBN: 0-8186-7475-X.
Levine B. N. et al.: "A comparison of known classes ofreliable multicast protocols" Netowrk Protocols, 1996 International Conference on Columbus, OH, USA Oct. 29-Nov. 1, 1996, Los Alamitos, CA, USA IEEE Comput. Soc. US Oct. 29, 1996, pp. 112-121, XP010204425 ISBN: 0-8186-7453-9.
Ishijima, et al., A Semi-Synchronous Circuit Design Method by Clock Tree Modification IEEE Trans. Fundamentals, vol. E85-A, No. 12 Dec. 2002.
Greenstreet, et al., Implementing a ST ARI Chip, IEEE 1995.
Hierarchical multiprocessor organizations; J. Archer Harris; David R. Smith; International Symposium on computer Architecture; Proceedings of the 4th annual symposium on Computer architecture pp. 41-48 Year of Publication 1977.
"Hierarchical Interconnection Networks for Multicomputer systems" Sivarama P. Dandamudi, et al. IEEE Transactions on Computers archive vol. 39, Issue 6 (Jun. 1990) pp. 786-797 Year of Publication: 1990.
A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 On pp. 254-264.
Performance Analysis of Multilevel Bus Networks for Hierarchichal Multiprocessors S.M. Mahmud IEEE Transactions on Computers archive vol. 43, Issue 7 (Jul. 1994) pp. 789-805 Year ofpublication: 1994.
Performance Analysis of a Generalized Class of M-Level Hierarchical Multiprocessor Systems LO. Mahgoub AK. Elmagarmid Mar. 1992 (vol. 3, No. 2) pp. 129-138.
Kober, Rudolf, "The Multiprocessor System SMS 201—Combining 128 Microprocessors to a Powerful Computer," Sep. 1977, Compean '77, pp. 225-230.
Knight, Thomas and Wu, Henry, "A Method for Skew-free Distribution of Digital Signals using Matched Variable Delay Lines," VLSI Circuits, 1993. Digest ofTeclmicial Papers. 1993 Symposium on, May 1993, pp. 19-21.
Popli, S.P., et al., "A Reconfigurable VLSI Array for Reliability and Yield Enhancement," Proceedings of the International Conference on Systolic Arrays, 1988, pp. 631-642.
John, L.K., et al., "A Dynamically Reconfigurable Interconnect for Array Processors," IEE Transactions on Very Large Scale Integration (lvsi) Systems, vol. 6, No. 1, Mar. 1998, pp. 150-157.
Schmidt, U., et al., "Datawave: A Single-Chip Multiprocessor for Video Applications," IEEE Micro, vol. 11, No. 3, Jun. 1991, pp. 22-25, 88-94.
Chean, M., et al., "A Taxonomy of Reconfiguration Techniques for Fault-Tolerant Processor Arrays," Computer, IEEE Computer Society, vol. 23, No. 1, Jan. 1990, pp. 55-69.
Kamiura, N., et al., "A Repairable and Diagnosable Cellular Array on Multiple-Valued Logic," Proceedings of the 23rd International Symposium on Multiple-Valued Logic, 1993, pp. 92-97.
LaForge, 1., "Externally Fault Tolerant Arrays," Proceedings: International Conference on Wafer Scale Integration, 1989, pp. 365-378.
Reiner Hartenstein, et al., On Reconfigurable Co-Processing Units, Proceedings of Reconfigurable Architectures Workshop (RAW98), Mar. 30, 1998.
Schmidt, U ., et al., "Data-Driven Array Processor for Video Signal Processing", IEEE—1990 (USA).
Muhammad Ali Mazidi, "The80x86 IBM PC and Compatible Computers", 2003, Prentice Hall, 4th edition, pp. 513-515.
Shigei, N., et al., "On Efficient Spare Arrangements and an Algorithm with Relocating Spares for Reconfiguring Processor Arrays," IEICE Transactions on Fundamentals of Electronics, communications and Computer Sciences, vol. E80-A, No. 6, Jun. 1997, pp. 988-995.
"Interference Management in Fem to Cell Deployment", Mingxi Fan, Mehmet Y avuz, Sanjiv Nanda, Y eliz Tokgoz, Farhad Meshkati, Raul Dangui, Qualcomm Incorporated, Qualcomm 3GPP2 Femto Workshop, Boston, MA, Oct. 15, 2007.

\* cited by examiner

MULTIMODE BASE STATION

PRIORITY CLAIM

This application is a continuation application of U.S. patent application Ser. No. 13/440,880, filed Apr. 5, 2012, entitled "MULTIMODE BASE STATION," which claims priority to and the benefit of Great Britain Application No. 1105769.2 filed on Apr. 5, 2011. Each of these applications is incorporated herein by reference in its entirety.

FIELD OF THE INVENTION

The present invention relates to controlling admission of user equipment to a cell of a multimode base station (such as multimode picocell, femtocell or the like) which is arranged to operate as two or more logical cells.

RELATED ART

As will be familiar to a person skilled in the art, a base station is the unit which provides a user equipment such as a mobile phone or computer with access to a wireless cellular network such as a network operating according to both 3G and 4G standards, the base station being the first stage up from the user equipment in the cellular hierarchy, i.e. the unit with which the user equipment immediately communicates via a wireless connection (without an intermediary station). According to 3GPP terminology, a base station is sometimes referred to as a "node B", but the more generic term "base station" will be maintained herein for convenience.

A femtocell is a type of cellular base station designed to operate over a relatively short range compared to a conventional base station. Short-range dedicated base stations such as femtocells have become more viable in recent years due to reduction in the cost and size of the electronics required to implement a cellular base station. The idea is to provide a dedicated base station to cover a relatively small geographical area which is expected to experience a high density of users and/or regular usage. For example femtocells are typically intended to be deployed in a small office, shop, café or even the home. Other types of short range base stations include picocells or microcells, typically covering an intermediately sized area; although the scope of femtocells is increasing as they are encroaching on what have been traditionally called picocells and microcells, supporting large offices, shopping malls and outdoor deployments. The scope of femtocells is increasing due to increased functionality over picocells and microcells. In some wireless standards, femtocells combine the functionality of several wireless network elements, for example in UMTS a femtocell combines the functionality of a base station and radio network controller (RNC). Also, it is typical for a femtocell to be installed by the end user, not the network operator, and extra functionality is required to support this, such as the ability to locate (sniff) neighboring base stations. This is in contrast to picocells and microcells that are installed by a network operator and only provide base station functionality.

Base-stations (BS), including femtocells, contain a radio resource management (RRM) entity which includes admission control mechanisms to decide whether a new connection request from a user equipment (UE) should be admitted. This RIM entity may refuse the UE access to the BS due to it being congested and unable to support more users. This congestion can be on the air-interface, but could also be related to hardware processing resources, or back-haul congestion. When a base-station experiences congestion it has the following options:

If the UE is very high priority, for example, an emergency call, it must accept this UE and release or downgrade an alternative UE.

The base-station can direct the UE to an alternative base-station for service, where this base-station could be at a different frequency sub-band or a different radio access technology (RAT).

The base-station can offer to service the UE with a lower quality of service (QOS) than it requested.

The base-station can refuse service to the UE and not provide any alternatives.

A dual-mode femtocell is a base-station operating as two cells. These cells could be operating as different RATs, or the same RATs but in different sub-bands. Each cell operates an independent RRM admission control mechanism.

SUMMARY

If both the cells operate an independent RRM admission control mechanism then this can lead to inefficient use of base-station resources—a UE could be admitted to the least optimum cell for its QOS, or one cell could be fully loaded while the other is only lightly loaded, Improvements could be achieved by performing joint admission control for a dual-mode femtocell. These improvements can be related to the throughput and QOS achieved by the admitted UE, other UE in the same cell, or UEs in neighboring cells.

Therefore according to one aspect of the present invention, there is provided a method of controlling admission of a user equipment to a cell of a multi-mode base station, being a base station arranged to operate as a plurality of cells, the plurality of cells comprising at least a first cell and a second cell, and the method comprising: determining information relating to the first cell, and controlling admission of a user equipment to the second cell in dependence on the information relating to the first cell.

In embodiments the determination of the information may comprise monitoring statistics of past behavior of the user equipment when connected to the first cell, and the control of admission may be dependent on the statistics of the past behavior of the user equipment in the first cell.

The method may comprise monitoring statistics relating to past behavior of the user equipment when connected to the second cell, and controlling admission of the user equipment to the second cell in dependence on the statistics relating to past behavior of the user equipment in both the first cell and the second cell.

The method may comprise receiving a request from the user equipment for admission to the first cell and, in response to the request for admission to the first cell, admitting the user equipment to the second cell based on the statistics relating to past behavior of the user equipment in the first cell.

The admission of the user equipment to the second cell in response to the request for admission to the first cell may be based on the statistics relating to past behavior of the user equipment in both the first cell and the second cell.

The user equipment may be admitted to the second cell based on the statistics relating to past behavior before the user equipment indicates quality of service requirements to the base station.

The method may comprise receiving a request from the user equipment for access to the second cell, and in response to the request admitting the user equipment to the second cell based on the statistics relating to past behavior of the user equipment in the first cell.

The admission of the user equipment to the second cell may be based on the statistics relating to past behavior of the user equipment in both the first cell and the second cell.

The user equipment may be admitted to the first cell based on the statistics relating to past behavior before the user equipment indicates quality of service requirements to the base station.

The statistics relating to past behavior of the user equipment may comprise at least one of: a downlink throughput requested by the user equipment from the respective cell, and an uplink throughput requested by the user equipment from the respective cell.

The statistics relating to past behavior of the user equipment may comprise at least one of a downlink throughput used by the user equipment in the respective cell, and an uplink throughput used by the user equipment in the respective cell.

The statistics relating to past behavior of the user equipment may comprise at least one of a downlink latency requested by the user equipment from the respective cell, and an uplink latency requested by the user equipment from the respective cell.

The statistics may represent a predetermined period, the method may comprise determining an average of the statistics representing the period, and the control of admission may be based on the average.

The method may comprise determining a variation of the average of the statistics representing the period, and the control of admission may be based on the variation of the average. The statistics may represent a predetermined period of at least one day. The statistics may represent a predetermined period of at least one week. In further embodiments, the determination of the information may comprise determining a prediction of performance of the first cell, and the control of admission may be dependent on the prediction of performance in the first cell.

The method may comprise determining a prediction of performance of the second cell, and the control of admission may be dependent on the prediction of performance for both the first cell and the second cell.

The method may comprise receiving a request from the user equipment for admission to the first cell; and, in response to the request for admission to the first cell, admitting the user equipment to the second cell based on the prediction of performance of the first cell.

The admission of the user equipment to the second cell in response to the request for admission to the first cell may be based on the prediction of performance of both the first cell and the second cell.

The user equipment may be admitted to the second cell in response to the request for admission to the first cell without being admitted to the first cell between the request for admission to the first cell and the admission to the second cell.

The method may comprise receiving a request from the user equipment for access to the second cell, and in response to the request admitting the user equipment to the second cell based on the statistics relating to past behavior of the user equipment in the first cell.

The admission of the user equipment to the second cell may be based on the prediction of performance of both the first cell and the second cell. The determination of performance may comprise a measure of at least one of: downlink throughput, downlink latency, uplink throughput, and uplink latency.

The measure may comprise at least one of: a maximum downlink throughput of the respective cell, a minimum downlink latency of the respective cell, a maximum uplink throughput of the respective cell, and a minimum uplink latency of the respective cell.

The measure may comprise a measure of an available air interface resource of the respective cell. The measure may comprise a measure of a hardware resource of the base station available for the respective cell. The measure may comprise a measure of path loss for the respective cell. The measure may comprise a power limit of the respective cell. The measure may comprise an estimate of noise and/or interference in the respective cell. In yet further embodiments, the control of admission may be based on comparison of the past behavior with the predicted performance.

According to another aspect of the present invention, there is provided a multi-mode base station arranged to operate as a plurality of cells, the plurality of cells comprising at least a first cell and a second cell, and the base station comprising a radio resource manager for controlling admission of a user equipment to the cells, the radio resource manager being configured to perform operations in accordance with any of the above combinations of method features.

According to another aspect of the present invention, there is provided a computer program product for controlling access to a cell of a multi-mode base station, being a base station arranged to operate as a plurality of cells, the plurality of cells comprising at least a first cell and a second cell, and the computer program product being embodied on a non-transient computer-readable medium and configured so as when executed on a processor of the base station to perform the operations of any of the above combinations of method features

BRIEF DESCRIPTION OF THE DRAWINGS

For a better understanding of the present invention and to show how it may be put into effect, reference is made by way of example to the accompanying drawings in which.

DETAILED DESCRIPTION

Figure 1:
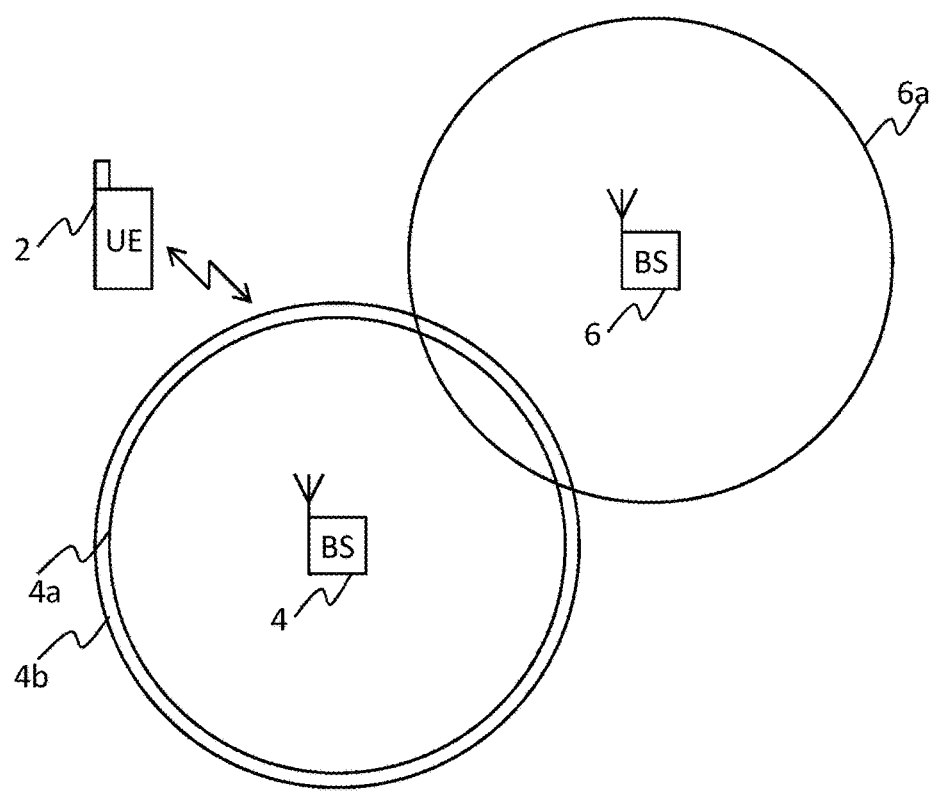
FIG. 1 is an illustration of a part of a wireless cellular communication network.

FIG. 1 is a schematic diagram showing a part of a wireless cellular communication network such as a 3G network. The network comprises a user equipment (UE) 2 in the form of a mobile terminal, such as a smart phone or other mobile phone, a tablet, or a laptop or desktop computer equipped with a wireless data card. The network further comprises a base station in the form of a femtocell 4, and one or more further base stations 6. Each base station 4, 6 provides network coverage in the form of at least one respective cell 4a, 4b, 6a.

Furthermore, the femtocell 4 is configured as a dual mode femtocell. A dual-mode femtocell is a base station operating as two logical cells 4a and 4b. These cells 4a, 4b may be configured to operate according to different radio access technologies (RATs), i.e. different telecommunication standards. For example one of the dual cells may be arranged to operate according to a 3G standard such as a Universal Mobile Telecommunications System (UMTS) standard and the other of the dual cells may be arranged to operate according to a 4G standard such as a Long Term Evolution (LTE) standard. Alternatively, the cells 4a, 4b may be arranged to operate according to the same RAT but in different frequency sub-bands. The reach of the cells 4a, 4b does not necessarily extend across exactly the same geographical area. Range is highly dependent on RAT and frequency, e.g. cell 4a could be twice the size of cell 4b. The arrangement shown in FIG. 1 is only schematic. On a point of terminology, note that "base station" or "femtocell" refers to the unit, whilst "cell" refers to the logical combination of geographical coverage area and access technology or frequency band (also note that in the context of the present application "femtocell" refers to the base station unit rather than the cell). As the two cells 4a, 4b are provided by the same base station unit then they share the same cell center point, i.e. represent the same geographical node of the network, and they also share at least some of the same hardware resources. For example a dual-mode base station 4 typically shares the same processor for both cells 4a, 4b, though typically not the same antenna. The dual cells 4a, 4b typically also share other base-station functionality, such as configuration management, synchronization and backhaul connection (i.e. same connection to the next element up in the cellular hierarchy).

The invention could apply equally to any multi-mode base station, but by way of illustration the following embodiments are described in relation to a dual-mode femtocell 4.

The user equipment 2 is arranged to be able to request admission to a particular cell, and when it does so, e.g. requesting admission to cell 4a, to request a particular quality of service. For example it could request to be provided with at least a certain uplink or downlink throughput, or to be provided with no more than a certain uplink or downlink latency.

Each of the base stations comprises a radio resource manager (RRM) arranged to receive the admission request from the UE and decide whether to admit the user equipment 2 to the requested cell. Conventionally this is done in the manner described in the background section above by an independent RRM for each cell 4a, 4b, 6 respectively, including independent admission control for each of the dual cells 4a, 4b. However, according to the present invention there is provided a joint admission control mechanism which shares information between the two or more cells 4a, 4b of a multimode base station such as a dual-mode femtocell 4, i.e. shares information relevant to service quality in the two or more cells. This allows the radio resource manager for a requested cell 4a to make a decision not only based on information of the requested cell 4a itself, but also based on information of the one or more alternative other cells 4b of the multimode base station 4.

At a higher level of the cellular hierarchy the network may comprise one or more higher-level controller stations, which may be arranged to perform various further management functions. However, the present invention is concerned with radio resource management at the level of a multi-mode base station.

According to a first embodiment of the present invention, the process of determining the throughput and/or other QOS requirements of a UE 2 can be enhanced by storing long-term statistics of UE behavior at the RRM. This allows the RRM to use past-behavior to admit the UE to the most appropriate cell 4a, 4b of a dual-mode femtocell 4.

The joint RRM can keep a history of the past connections for a specific UE 2, and this can be used to determine the services and throughput requirements that a specific UE typically uses. The long-term parameters kept by the RRM can include the following:

Requested downlink throughput
Requested uplink throughput
Utilized downlink throughput
Utilized uplink throughput
Requested downlink latency
Requested uplink latency For these parameters, one or more of the following statistics can be collected:

Long-term average values for the parameters, giving a measure for basic prediction Variation for the average over 24 hour periods, to find behavior patterns across each day.

Variation for the average over 7 days, to find behavior patterns across each week.

Short-term average values (over a few hours) to find local trends.

These parameters and statistics allow the RRM to predict the throughput and/or other QOS requirements of a particular UE 2. The RRM can then decide whether to continue admitting the UE 2 to the cell 4a it is requesting, or whether to immediately admit the UE 2 to an alternative, more appropriate cell 4b. The use of joint RRM combined with long-term statistics enables the best cell selection to happen faster, preferably before the UE 2 indicates its QOS requirements to the femtocell 4. In addition, moving the UE 2 between cells 4a, 4b at the start of the admission process requires fewer signaling messages, thus reducing the signaling load on the network.

A base station 4 may be configured to operate in one of a plurality of different available modes. Closed access mode is where the cell only provides a service to a subset of UE which are all members of its closed subscriber group (CSG). Open access mode is where the cell provides a service to any UE that are entitled to a service from the network operator (i.e. this is identical mode used in macro, micro and pica cells today). Hybrid access mode is where the cell provides a service to any UE that are entitled to a service from the network operator, but it also has a list of UE in its CSG. This allows the cell to provide an improved service level to these CSG (if it wants to).

Tracking UE parameters and statistics is most beneficial in a femtocell 4 operating in either closed or hybrid mode where a finite closed group of subscribers exist, which are expected to regularly access the femtocell. This regular access allows reliable predictions to be made.

The long-term prediction of statistics described above can be either used standalone, or used to produce downlink throughput and latency values (Thp_DL_Req, Latency_DL_Req) and uplink throughput and latency values (Thpt_UL_Req, Latency_UL_Req) to be combined with a second embodiment of the invention, described below.

According to a second embodiment of the present invention, the selection of the best cell 4a, 4b of the dual mode femtocell 4 can be enhanced by predicting the throughput and latency of each cell that can be achieved.

The downlink throughput and latency which is achievable can be determined from:

The static properties of the cell, for example, minimum achievable latency and maximum achievable throughput.

The available air interface resources based on the number of currently serviced UEs. For example, in LTE this would be the number of resource blocks (RB), while for UMTS this would be the number of codes available.

The available hardware resources for the cell which relate to the total number of UEs supported, or the number of UEs supported each subframe (LTE) or TTI (UMTS).

The pathloss to the UE for this cell, which can be very different for each cell.

Any power limit applied to the cell to protect neighbors in the same frequency sub-band. This could be determined by pathloss to neighbors, downlink loading information for the victim BS, proximity information for the victim UE, and the operating mode for the femtocell (closed, hybrid, open).

Estimation, via sniffing, of the noise and interference floor at the UE for this frequency sub-band Similarly, the uplink throughput and latency which is achievable can be determined from:

The static properties of the cell, for example, minimum achievable latency and maximum achievable throughput.

The available air interface resources based on the number of currently serviced UEs. For example, in LTE this would be the number of resource blocks (RB), while for UMTS this would be the number of codes available.

The available hardware resources for the cell which relate to the total number of UEs supported, or the number of UEs supported each subframe (LTE) or (UMTS), The pathloss to the femtocell for this cell, which can be very different for each cell.

Any power limit applied to the cell to protect neighbors in the same frequency sub-band. This could be determined by pathloss to neighbors and uplink loading information for the victim BS.

Estimated of the noise and interference floor at the femtocell for this frequency sub-band.

These parameters can be used to determine a set of uplink and downlink throughput and latency prediction for each cell, denoted by (Thpt_DL_A, Thpt_DL_B, Latency_DL_A, Latency_DL_B) and (Thpt_UL_A, Thpt_UL_B, Latency_UL_A, Latency_UL_B).

The UE is assigned to the cell with the throughput and latency capabilities which most closely match the UE requirements.

This prediction of achievable throughput and latency is applicable to a femtocell operating in any of the three modes closed, hybrid or open.

This can be used standalone when the UE reports its QOS requirements to the base-station, or combined with the UE throughput and QOS prediction described in the first embodiment.

In addition, if a cell is heavily loaded (congested), the first and second embodiments of the invention can be used together to form a prediction of throughput and latency of each of multiple UEs, in each cell. Thus the UE is able to be optimally redistributed at the dual-mode femtocell. For example, the following values would be determined:

UE1 in RATA, UE2 in RATA
UE1 in RATA, UE2 in RATB
UE1 in RATB, UE1 in RATA
UE1 in RATB, UE1 in RATB The most efficient combination of UE and RAT can then be selected.

Figure 2:
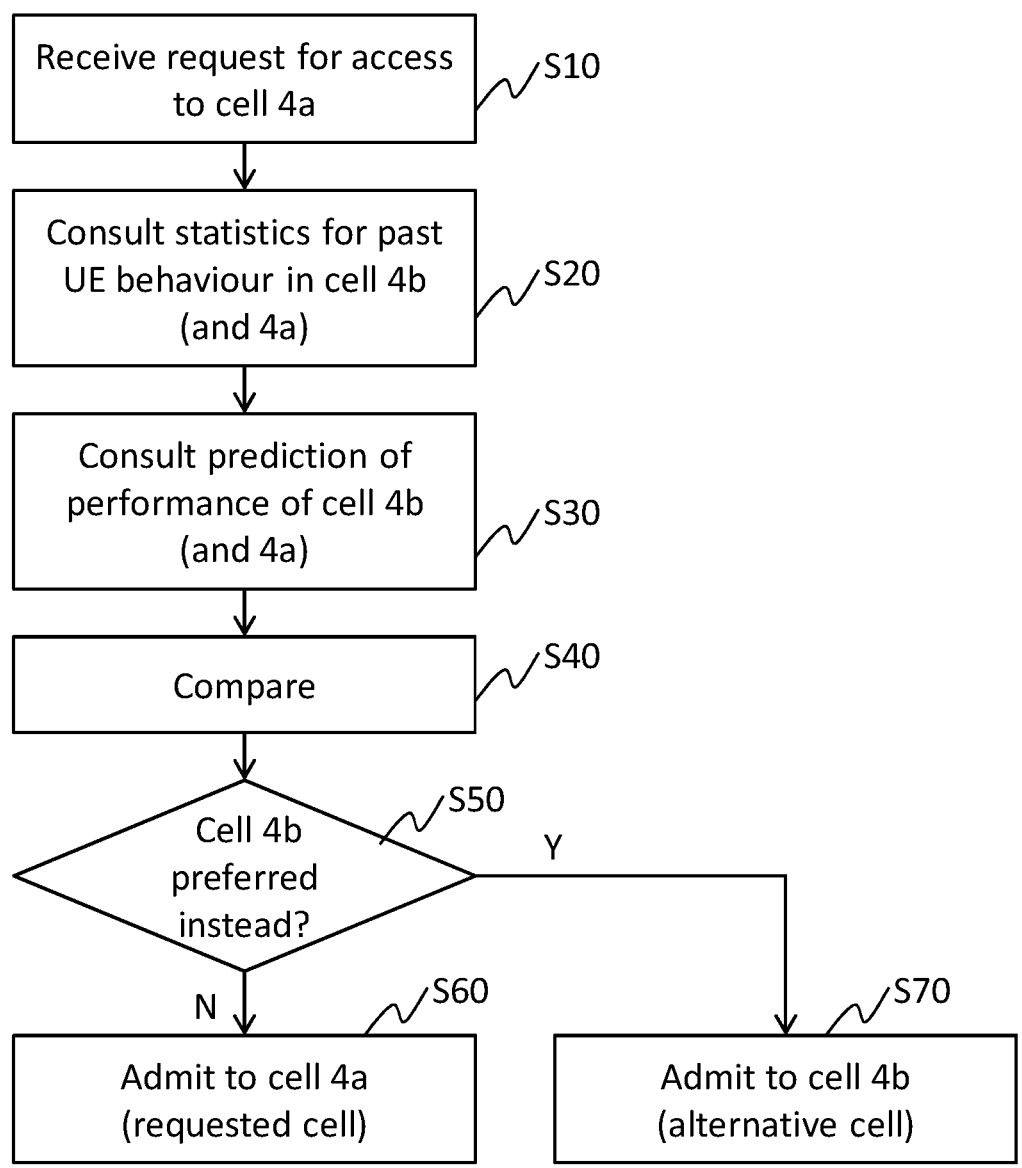
FIG. 2 is a flow chart of a method of controlling access to a multi-mode base station.

The flow chart of FIG. 2 illustrates an example of a preferred decision making process which may be implemented in a joint RRM of a multimode base station such as a dual mode femtocell 4. The process is preferably implemented in the form of computer program code stored on a non-volatile storage medium of the base station 4 (e.g. magnetic memory device such as a hard drive or an electronic memory device such as a flash memory) and arranged for execution on a processing apparatus of the base station (e.g. single or multi core CPU). However, an implementation involving dedicated hardware is not excluded.

At step S10 the RRM of the femtocell 4 receives a request from the UE 2 for admission to a particular cell of the dual mode femtocell 4, e.g. cell 4a.

At step S20, the RRM consults the past statistics it has accumulated for the UE 2 when it was connected in the alternative cell 4b (and preferably also the past statistics it has accumulated for the UE 2 when it was connected in the requested cell 4a itself). Generally the past statistics can be collected from either cell or both cells. The RRM uses these statistics to produce expected downlink throughput and/or latency values (Thp_DL_Req, Latency_DL_Req), and/or to produce uplink throughput and/or latency values (Thpt_UL_Req, Latency_UL_Req). For reasons discussed above, in a particularly preferred implementation this is done before the UE 2 signals its own requested QOS requirement(s) to the femtocell 4. The values may be calculated from the statistics in response to the request, or for faster response time may be maintained in advance of the request.

At Step S30, the RRM consults its prediction of performance of the alternative cell 4b (and preferably also its prediction of performance of the requested cell 4a), i.e. its prediction of one or more a priori properties that are a feature of the cell itself rather than an a posteriori observed behavior of the UE 2 when connected in the cell. Generally the performance can be determined for either cell or both cells This results in a set of uplink and/or downlink throughput and/or latency prediction values for each cell, (Thpt_DL_A, Thpt_DL_B, Latency_DL_A, Latency_DL_B) and (Thpt_UL_A, Thpt_UL_B, Latency_UL_A, Latency_B). Again in a particularly preferred implementation this is done before the UE 2 signals its own requested QOS requirement(s) to the femtocell 4; and the values may be calculated from the statistics in response to the request, or for faster response time may be maintained in advance of the request.

At Step S40, the RRM compares the expected QOS requirement(s) of the UE2 (Thpt_DL_Req, Latency_DL_Req, Thpt_UL_Req, and/or Latency_UL_Req) with the predicted performance value(s) of the alternative cell 4b (Thpt_DL_A, Thpt_DL_B, Latency_DL_A, Latency_DL_B, Thpt_UL_A, Thpt_UL_B, Latency_UL_A, and/or Latency_UL_B), and at step S50 determines based on the comparison whether the UE 2 should be served by the alternative cell. Preferably this involves also comparing the expected QOS requirement(s) of the UE2 with the predicted performance value(s) of the requested cell 4b, and determining whether the requested cell 4a or the alternative cell 4b represents the best match to the UE's needs.

If the RRM decides the UE 2 would not be better served by the alternative cell 4b, it proceeds to step S60 where it admits the UE 2 to the requested cell 4a. If on the other hand the RRM decides the UE would be better served by the alternative cell 4b, it proceeds to step S70 where it admits the UE 2 to the alternative cell 4b. This may involve instructing the UE 2 to connect to the alternative cell 4b or offering it the option of connecting to the alternative cell 4b (the UE 2 could attempt a connection to a cell 6a of a different base station 6 in response to the offer).

In further embodiments, the RIM may receive requests from multiple UEs 2 and may take into account the expected QOS requirements and/or requested QOS for the multiple UEs, so as to determine an optimal set of decisions balancing the needs of all parties involved. The decision making process may also involve more than two cells of a multimode femtocell or other such multimode base station, e.g. by performing multiple instances of the above-described comparison process for multiple alternative cells and determining which comparison results in the best match.

It will be appreciated that the above embodiments have been described only by way of example.

For instance, the above has been described in terms of throughput and/or latency, but other information relevant to service quality could also be used in addition or as an alternative to these, e.g. error rate, loss or jitter.

Whilst it is preferred that the first and second embodiments are used together, this is not necessarily the case. For example the first embodiment could be used alone by taking the UE's past experience of high throughput or low latency in an alternative one of the multiple cells 4b as a trigger to admit the UE to that cell 4b instead of the requested cell 4a. Or in another example the second embodiment could be used alone by comparing the predicted performance of the alternative cell 4b with the UE's actual requested QOS, instead of basing the comparison on the US's expected QOS as would be determined from statistics of past behavior according to the first embodiment.

Other variations may become apparent to a person skilled in the art given the disclosure herein. The scope of the invention is not limited by the described embodiments but only by the claims.

What is claimed is:

1. A method of controlling admission of a user equipment to a cell of a multi-mode base station, the multi-mode base station configured to operate as a first cell and a second cell representing the same geographical node of the network, the method comprising:
consulting by the multi-mode base station, in response to a cell access request received from a user equipment (UE) for admission of the UE to the second cell of the multi-mode base station, statistics of a history of past connections of the UE stored at a radio resource management entity of the second cell;
determining, by the multi-mode base station before the multi-mode base station receives a quality of service request from the UE and before the UE is connected to the first cell or the second cell, an expected quality of service for the UE in the event that the UE is admitted to the second cell based on the history statistics, the history statistics including past behavior when the UE was connected to the first cell of the multi-mode base station;
performing an evaluation comprising a predicted quality of service for the UE in the event that the UE is admitted to the second cell based on the history statistics, the predicted quality of service for the UE being made before the multi-mode base station receives a quality of service request from the UE and before the UE is connected to the first cell or the second cell; and
determining whether to admit the UE to the second cell based on the requested quality of service, the expected quality of service, and the predicted quality of service.

2. The method of claim 1, wherein the second cell has a different cell type or a different cell size relative to the first cell.

3. The method of claim 1, wherein the determination of whether to continue admitting the UE to the second cell depends upon a load of the second cell.

4. The method of claim 1, wherein the statistics comprise past behavior accumulated over a period of time when the UE was connected to the second cell.

5. A computer program product embodied on a non-transitory computer-readable medium, the computer program comprising program instructions, upon execution by a processor of the multi-mode base station cause the processor to perform the method of claim 1.

6. A radio resource management entity operable in a multi-mode base station having a first cell and a second cell corresponding to a given geographical node of a wireless network, the radio resource management entity comprising a processor configured to:
determine, in response to a cell access request received from a user equipment (UE) for admission of the UE to the second cell of the multi-mode base station, statistics of a history of past connections of the UE available to a radio resource management entity of the second cell based upon information relevant to quality of service in the first cell being available to the radio resource management entity of the second cell;
determine, before the multi-mode base station receives a quality of service request from the UE and before the UE is connected to the first cell or the second cell, a predicted quality of service for the UE in the event that the UE is admitted to the first cell, the prediction of performance being based on the historical statistics; and
determine whether to continue admitting the UE to the second cell based on the predicted quality of service and the requested quality of service,
wherein the second cell has a different cell type or a different cell size relative to the first cell.

7. Radio resource management entity as claimed in claim 6, wherein the processor is configured to determine a predicted quality of service for the UE in the event that the UE is admitted to the second cell, and wherein the determination of whether to continue admitting the UE to the second cell is further based on the predicted quality of service for the UE in the event that the UE is admitted to the second cell.

8. Radio resource management entity as claimed in claim 6, wherein the predicted quality of service depends upon a total number of UEs supported by a respective one of the first cell and the second cell.

9. Radio resource management entity as claimed in claim 6, wherein the first cell and the second cell are configured to operate according to a same radio access technology, and wherein the second cell is configured to operate in a different sub-band relative to the first cell.

10. A computer program product embodied on a non-transitory computer-readable medium, the computer program for controlling cell admission of a user equipment (UE) to a multi-mode base station having a first cell and a second cell representing a same geographical node of a wireless network, the computer program comprising program instructions, upon execution by a processor of the multi-mode base station cause the processor to:
consult, in response to a cell access request received from the UE for admission of the UE to the second cell of the multi-mode base station, statistics stored at a radio resource management entity of the multi-mode base station, the statistics representing a history of past connections of the UE to the first cell relevant to an expected quality of service of the UE in the event that the UE is admitted to the second cell;
determine, before the multi-mode base station receives a quality of service requested by the UE and before the UE is connected to the first cell or the second cell, a predicted quality of service for the UE in the event that the UE is admitted to the second cell based on the historical statistics; and
determine whether to continue admitting the UE to the second cell based on the predicted quality of service and based on a cell load of at least one of the first cell or the second cell, the cell load including a number of UEs currently serviced by the respective cell.

11. The computer program product of claim 10, wherein the first cell and the second cell have different geographical ranges.

12. The computer program product of claim 10, wherein the first cell and the second cell correspond to different radio access technologies.

13. The computer program product of claim 10, wherein the cell load comprises a total number of UEs supported or a number of UEs supported each sub-frame by hardware resources of the respective cell.

14. The computer program product of claim 10, wherein the statistics comprise average values of cell parameters over respective predetermined time periods.

15. The computer program product of claim 10, wherein the determination comprises refusing admission of the UE to the second cell in response to the cell access request.

16. The computer program product as claimed in claim 10, wherein the statistics of the history of past connections comprises statistics representing a predetermined period of a history of past connections of the UE to the second cell.

17. The computer program product as claimed in claim 10, comprising: admitting the UE to the second cell as a result of the determining.

18. The computer program product as claimed in claim 10, comprising: instructing the UE to connect to an alternative cell corresponding to the first cell or to a cell of a different base station when it is determined not to continue admitting the UE to the second cell.

19. The computer program product as claimed in claim 10, wherein the determining whether to continue admitting the UE to the second cell based is further based on the requested quality of service for the UE.

20. The computer program product as claimed in claim 10, wherein the first cell and the second cell correspond to a same radio access technologies in different sub-bands.

21. The computer program product as claimed in claim 10, wherein the determination of whether to continue admitting the UE to the second cell is based on the cell load of the first cell and the second cell.

* * * * *